United States Patent
Schloss et al.

[11] Patent Number: 5,965,081
[45] Date of Patent: Oct. 12, 1999

[54] METHOD OF MAKING SIDE-GATED PREFORMS FOR USE IN BLOW MOLDING PLASTIC BOTTLES

[75] Inventors: Francis M. Schloss, Perrysburg; Dennis C. Balduff, Whitehouse, both of Ohio

[73] Assignee: The Coca-Cola Company, Atlanta, Ga.

[21] Appl. No.: 08/648,664

[22] Filed: May 16, 1996

[51] Int. Cl.⁶ .......................... B29C 45/14; B29C 45/16; B29C 49/22
[52] U.S. Cl. .......................... 264/513; 264/537; 264/255
[58] Field of Search ................... 264/513, 537, 264/255, 250, 328.8, 516, 271.1; 425/121, 126.1, 533

[56] References Cited

U.S. PATENT DOCUMENTS

| | | | |
|---|---|---|---|
| 2,559,861 | 7/1951 | Fay | 264/513 |
| 2,710,987 | 6/1955 | Sherman | 264/513 |
| 3,341,043 | 9/1967 | Santelli | 264/513 |
| 3,597,517 | 8/1971 | Smith | 264/537 |
| 3,733,309 | 5/1973 | Wyeth et al. | |
| 3,804,663 | 4/1974 | Clark . | |
| 4,069,933 | 1/1978 | Newing . | |
| 4,293,520 | 10/1981 | Akutsu | 264/513 |
| 4,501,781 | 2/1985 | Kushida et al. . | |
| 4,511,418 | 4/1985 | Tsukada et al. | 156/245 |
| 4,550,043 | 10/1985 | Beck . | |
| 4,575,915 | 3/1986 | Clark et al. . | |
| 4,606,942 | 8/1986 | Shriver et al. . | |
| 4,609,516 | 9/1986 | Krishnakumar et al. . | |
| 4,710,118 | 12/1987 | Krishnakumar et al. . | |
| 4,725,464 | 2/1988 | Collette . | |
| 4,746,538 | 5/1988 | Mackowski . | |
| 4,752,208 | 6/1988 | Iwata et al. | 264/513 |
| 4,892,392 | 1/1990 | Broer . | |
| 4,910,054 | 3/1990 | Collette et al. . | |
| 4,923,723 | 5/1990 | Collette et al. . | |
| 4,944,576 | 7/1990 | Lacker et al. . | |
| 4,950,143 | 8/1990 | Krishnakumar et al. . | |
| 4,954,376 | 9/1990 | Krishnakumar et al. . | |
| 4,966,543 | 10/1990 | Krishnakumar et al. . | |
| 5,024,850 | 6/1991 | Broer et al. . | |
| 5,032,341 | 7/1991 | Krishnakumar et al. . | |
| 5,049,345 | 9/1991 | Collette et al. . | |
| 5,112,212 | 5/1992 | Akselrud . | |
| 5,143,733 | 9/1992 | Von Buren et al. . | |
| 5,200,207 | 4/1993 | Akselrud et al. . | |
| 5,529,743 | 6/1996 | Powell | 264/513 |

*Primary Examiner*—Angela Ortiz
*Attorney, Agent, or Firm*—Birch, Stewart Kolasch & Birch, LLP

[57] ABSTRACT

A method of injection molding a multi-layer preform from a combination of virgin and recycled plastic such as PET so that the resultant blow molded bottle has a reduced tendency for bottom failure in spite of the use of the recycled plastic. A mold cavity for injection molding the preform is provided and includes an injection gate located along a sidewall of the cavity rather than at a conventional location in the closed end of the cavity which forms the bottom of the preform. The plastic material is injected through the gate in the sidewall which avoids the presence of crystalline "slugs" in the bottom region of the preform. This creates a preform and resultant blow molded bottle with a much more durable bottom which is not subject to various types of cracking.

10 Claims, 1 Drawing Sheet

METHOD OF MAKING SIDE-GATED PREFORMS FOR USE IN BLOW MOLDING PLASTIC BOTTLES

BACKGROUND OF THE INVENTION

The present invention relates to a method of injection molding an improved preform for use in blow molding a container such as a beverage bottle having a bottom with improved structural strength and durability.

More specifically, the present invention relates to a method of injection molding a multi-layer preform from a combination of virgin and recycled plastic such as PET so that the resultant blow molded bottle has a reduced tendency for bottom failure in spite of the use of the recycled plastic.

It is desirable to be able to fabricate multi-layer plastic beverage bottles from the combination of virgin and recycled plastics, such as PET. Ideally recycled PET comprises a central layer of a three-layer bottle structure wherein the inner and outer layers both comprise a higher grade of more expensive virgin PET, so that neither the beverage in the bottle nor the consumer comes into direct contact, with the recycled plastic (PET).

Typically the quality and strength of plastic is measured by its intrinsic viscosity (IV). For example, blow molded plastic PET bottles are generally fabricated from virgin PET having an IV from about 0.70 to about 0.86. On the other hand recycled PET generally has an IV less than 0.74 and from about 0.63 to 0.72.

The lower intrinsic viscosity, recycled PET, is less durable than the higher IV, virgin PET. Therefore, it is subject to a higher probability of creep, stress cracking, impact failure, burst failure or cracking from various other causes. This problem is particularly acute in the bottom region of the bottle which is subject to more wear and tear.

In stretch blow molding plastic containers a preform is typically injection molded and thereafter internally pressurized within a blow mold in order to form a bottle. The sidewalls or body of the preform are materially expanded during the blow molding process causing biaxial orientation of the plastic and increased strength. However, the bottom region of the preform is not materially expanded to the same extent and, therefore, does not undergo biaxial orientation to any significant degree that will result in increased strength. Therefore, regardless of the type of material utilized, the bottom region of the bottle is inherently weaker than the sidewall regions forming the body.

In conventional blow molding the preform mold cavity is filled with injection material through the center point of the base portion of the preform through the injection gate. Typically, crystalline sections (sometimes referred to as "slugs") are produced at the gate after injection molding because there is a steep gradient of temperature at this point caused by the hot (melt) to cold (solidified plastic) interface. This gate crystallinity not only is more brittle than is amorphous or non-crystalline PET, but it also creates high stress concentrations in the base of the final bottle since crystalline material does not stretch and orient during the orientation blow molding process and since the differential densities between adjacent crystalline and amorphous sections induces high residual stresses in the molded preform. This problem becomes even more acute when using a low intrinsic viscosity (IV) plastic since it is subject to a higher crystallization rate and more of the cracking failure problems than a plastic of a higher IV.

Accordingly, a need in the art exists for a method of injection molding a preform which substantially eliminates the presence of "slugs" in the bottom region of the preform in order to achieve a resultant blow molded bottle with a more durable bottom structure.

SUMMARY OF THE INVENTION

Accordingly, it is a primary object of the present invention to eliminate stress cracking, burst failure or other forms of cracking failure which may occur in the bases of bottles made with an outer layer of recyclable PET and an inner layer of virgin PET, by eliminating stresses caused by differential cooling in a conventional gate and by eliminating substantially all of the crystallinity which typically occurs at the point of a conventional PET injection molding gate on the outer layer.

It is a further object of the present invention to provide a method for injection molding a multi-layer preform for blow molding beverage bottles including at least one injection molded layer of recycled plastic material, or a low IV plastic, as compared to the IV of the plastic of the remaining layers.

It is another object of the present invention to provide an improved method of making a blow molded container which has a bottom region with a reduced probability to incur stress cracking, impact failure, burst failure and other structural failures.

It is yet another object of the present invention to provide a method for making a preform and resultant blow molded beverage bottle with a multi-layer structure which is cheaper due to the partial use of recyclable plastic materials.

It is still a further object of the present invention to provide an improved method for making a beverage bottle which encourages recycling of plastic materials, and thus benefits the environment.

It is still another object of the present invention to provide a method of injection molding at least one layer of a multi-layer preform from recyclable plastics, or low IV plastics, onto a layer of higher IV plastic, while still achieving a bottom structure in a resultant blow molded container of high strength and durability.

It is still another object of the present invention to provide an improved structure for a multi-layer preform including at least one layer of recyclable or low IV plastic material.

The objects of the present invention are fulfilled by providing a method of injection molding a plastic preform to be blow molded into a container with improved strength characteristics in a bottom area thereof comprising the steps of:

providing a mold cavity having a longitudinal axis, sidewalls with a gate therein, an open end for accommodating a core rod and a closed end for forming a bottom area of the preform which becomes the bottom of the blow molded container; and injecting plastic materials for forming the preform into the mold cavity transversely of the longitudinal axis through the gate at positions spaced from the closed end in order to minimize undesirable crystallization in the bottom area of the preform.

It should be understood in accordance with the present invention that the preform may be either a single or multi-layer structure formed from the side gate injection technique of the present invention.

Preferably the preform is a multi-layer structure with the inner layer formed from plastic with a higher intrinsic viscosity (IV) than a second layer of plastic overmolded thereon. For example the inner layer may comprise virgin plastic and the second overmolded layer recycled plastic.

With a three-layer structure a third overmolded layer may be provided of the same or similar plastic to the high IV inner layer of virgin plastic.

Each of the plastic layers in a preferred embodiment comprise PET but other types of plastics could be utilized within the scope of the present invention. For example for "hot fill" applications, plastics with high temperature softening resistance (Tg) could be utilized. Polyesters with high Tg values for example may comprise polyethylene naphthalate (PEN) or its copolymers or blends. Other nonpolyester materials may also be utilized for one or more of the layers such as acrylonitrile, styrene, polyamides, acrylonitrile copolymers, polycarbonate, polyolefins etc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DESCRIPTION OF THE PREFERRED EMBODIMENTS

Figure 1:
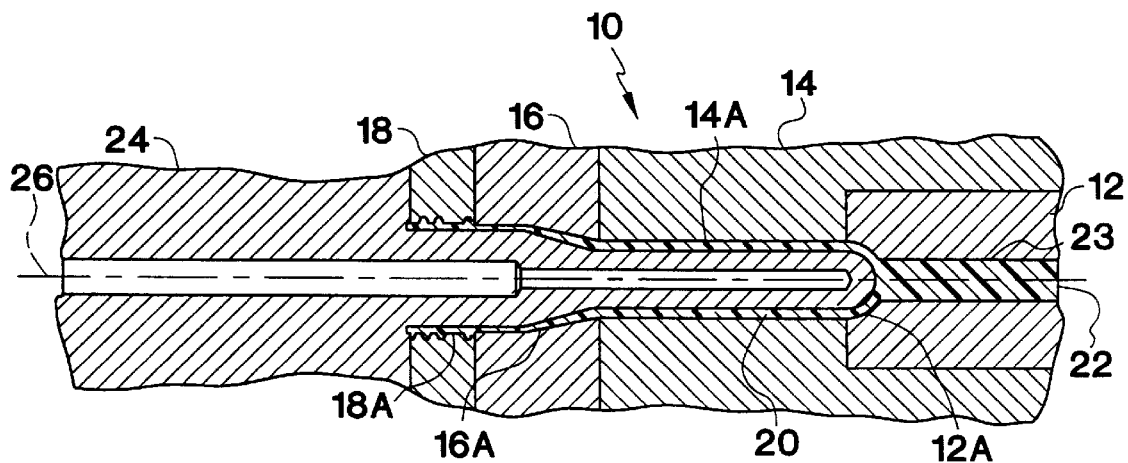
FIG. 1 is a cross-sectional view of an injection mold cavity depicted in side elevation, and a plastic preform being molded therein.
Figure 2:
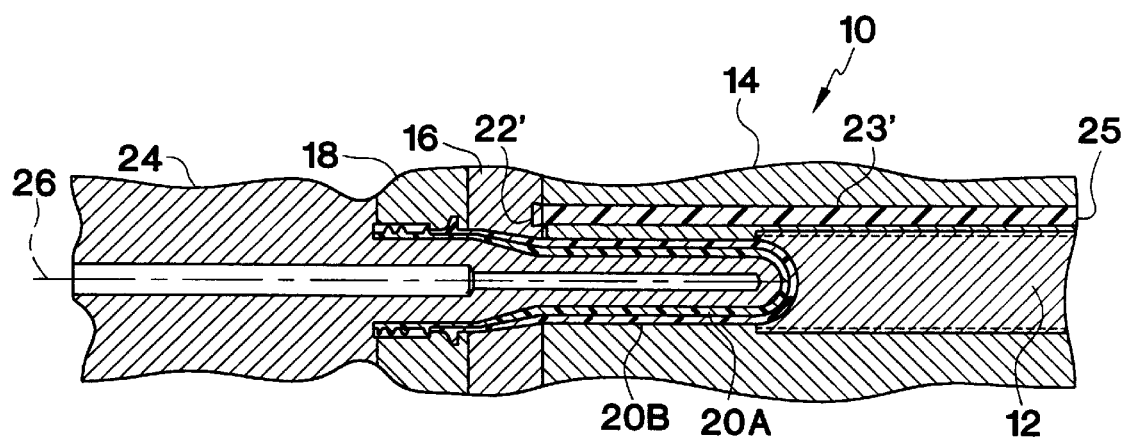
FIG. 2 is cross-sectional view of a sold cavity 10 depicting the side-gate injection technique of the present invention for overmolding a second plastic layer on the preform molded in the cavity of FIG. 1.

In accordance with the present invention a single layer, or multi-layer, preform is made in accordance with the side-gate injection technique illustrated in FIG. 2. If the preform is to be a multi-layer structure the inner layer can be made in accordance with conventional injection molding techniques illustrated in FIG. 1. In that figure, the mold cavity is generally indicated by 10 and is formed with an end cap 12 having a shaped end wall 12A for forming the base (end wall) of a preform 20. The main body of the preform 20 is formed in a female cavity defined by cavity block 14 which includes sidewalls 14A. Adjacent to block 14 is a transition block 16 for forming a transition region 16A between the body 14A and a threaded neck 18A formed in thread split block 18. All of the portions of the mold cavity and various blocks described are disposed on a common longitudinal axis 26. Also disposed on longitudinal axis 26 is a movable core rod 24 for supporting the interior of the preform 20 as it is molded. As is well known after the preform 20 is molded the core rod 24 is removed from the mold cavity with the preform 20 thereon, and the preform 20 may be transferred to an additional mold cavity or to some other processing station.

As illustrated in FIG. 1, a gate 22 for injecting the plastic material which forms preform 20 is provided in end cap 12 at substantially the center point of the closed end 12A of the mold cavity. A sprue 23 of the flowing plastic material is illustrated in the bore of the gate 22 which passes through end cap 12.

The cold runner mold design illustrated in FIGS. 1 and 2, which produces a sprue 23 or 23' joined to the molded part, is not essential to the practice of the invention, and other mold designs, such as a hot runner mold employing a mechanical gate or thermal shut-off could be used instead. With such a mold, a sprue would not be produced.

In accordance with the present invention the inner plastic layer of a multi-layer preform may be fabricated in accordance with the illustration of FIG. 1 by conventional injection molding techniques.

In a conventional injection molding technique with the injected material entering the mold cavity at the center point of the base portion of the preform, as illustrated in FIG. 1, typically crystalline sections (sometimes referred to as "slugs") are produced at the gate after injection molding because there is always a steep gradient of temperature at this point caused by the hot (melt) to cold (solidified plastic) interface. This gate crystallinity not only is more brittle than is amorphous or non-crystalline PET, but also creates high stress concentrations in the base of the final blow molded bottle since crystalline material does not stretch and orient during the orientation blow molding process of the bottle. Also the differential density between adjacent crystalline and amorphous sections induces high residual stresses in the molded preform.

In accordance with the present invention it was discovered that by repositioning the gate to a location as illustrated at 22' in FIG. 2, which is spaced from the bottom of the preform, all of the effects of crystalline "slug" in the bottom of the preform on the outer layer can be eliminated. As illustrated in FIG. 2 gate 22' is located at an interface between the transition block 16 and the cavity body block 14, and the plastic is injected substantially transversely to the longitudinal axis 26 forming an overmolded layer 20B on the preform 20. Inner layer 20A was formed in the mold of FIG. 1 and then inserted into the mold cavity as FIG. 2 by the core rod 24.

As illustrated in FIG. 2 the gate 22' communicates with a bore in the mold cavity 14 which accommodates the flow of injected material forming a sprue 23', which initially enters block 14 through an open end of the bore 25.

In accordance with a preferred embodiment of the present invention the inner layer 20A of preform 20 is formed from virgin plastic, such as a layer of virgin PET having a relatively high intrinsic viscosity (IV). The outer layer 20B of preform 20, formed in the mold cavity of FIG. 2, is formed from recycled PET having a much lower intrinsic viscosity (IV). The lower IV, recycled PET, is always more susceptible to cracking failure, because recycled PET simply has inferior strength characteristics compared to virgin PET. By eliminating the crystalline gate "slug" in the base area of the preform 20 utilizing the molding technique with a side gate illustrated in FIG. 2 in the second overmolding step, the resultant blown bottle exhibits superior cracking and burst failure resistance in the base area. Accordingly, the resulting preform having an inner virgin layer of PET, and a second overmolded layer of recycled PET made in accordance with the method illustrated in FIGS. 1 and 2, is an improvement over multi-layer preforms known heretofore.

In an additional embodiment a three layer preform may be fabricated by inserting the two layer preform resulting from the molding process in the mold cavity of FIG. 2 into a third mold cavity which could be similar to the mold cavity of FIG. 1 with a central gate located adjacent the closed end of the mold cavity in end cap 12. Preferably this third layer would be made from virgin PET in order to obtain a three-layer preform having recycled PET sandwiched between inner and outer layers of virgin PET. When such a three layer structure is blown into a bottle the product contained within the bottle contacts only virgin PET and the consumer which handles the bottle likewise contacts only virgin PET.

The use of PET is only a preferred or exemplary embodiment and it should be understood that other types of plastic material may be utilized as desired for forming the respective layers of the preform.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of injection molding a plastic preform to be blow molded into a container with improved strength characteristics in a bottom area thereof, comprising the steps of:

providing a mold cavity having a longitudinal axis, sidewalls with a gate therein, an open end for accommodating a core rod and a closed end for forming a bottom area of the preform which becomes the bottom of the blow molded container; and injecting plastic materials for forming the preform into the mold cavity transversely of the longitudinal axis through the gate at positions spaced from the closed end in order to minimize undesirable crystallization and stresses in the bottom area of the preform.

2. A method of injection molding a multi-layer plastic preform to be blow molded into a container comprising the steps of:

providing a first mold cavity defined by sidewalls, an open end for accommodating a core rod, and a closed end with an injection gate therethrough;

molding a plastic preform in said first mold cavity by injecting a plastic material through the gate;

providing a second mold cavity having a longitudinal axis, sidewalls with a gate therein, an open end for accommodating a core rod and a closed end for forming a bottom area of the preform;

inserting the molded preform into said second mold cavity; and injecting plastic materials for overmolding the preform into the second mold cavity transversely of the longitudinal axis through the gate of the second mold cavity at positions spaced from the closed end in order to avoid undesirable crystallization in the bottom area of the preform.

3. The method of claim 2 wherein the inner layer of the preform is formed from a first plastic having a higher resistance to stress cracking than the second layer of plastic overmolded thereon in the second mold cavity.

4. The method of claim 3 wherein the first plastic is PET with a given first IV, and the second plastic is PET with a second IV, the first IV being greater than the second IV.

5. The method of claim 3 wherein the first plastic is virgin plastic and the second plastic is recycled plastic.

6. The method of claim 5 wherein both the first and second plastics are PET.

7. The method of claim 6 wherein the first plastic is PET with an IV from about 0.70 to about 0.86, and the second plastic is PET with an IV from about 0.63 to about 0.72.

8. The method of any one of claims 2 to 7 including the further steps of:

providing a third mold cavity defined by sidewalls, an open end for accommodating a core rod, and a closed end with an injection gate therethrough;

inserting the molded preform into said third mold cavity; and overmolding a third layer of plastic material on the preform in said third mold cavity.

9. The method of any one of claims 2 to 7 wherein the sidewalls of said second mold cavity comprise a body portion, a transition portion adjacent to the body portion and a neck portion, the gate being disposed at an interface between the body portion and the transition portion.

10. The method of claim 1 wherein the sidewalls of said mold cavity comprise a body portion, a transition portion adjacent to the body portion and a neck portion, the gate being disposed at an interface between the body portion and the transition portion.

* * * * *